Aug. 26, 1958
A. H. FREDRICK ET AL
2,849,184
WIND COMPUTER
Filed Aug. 16, 1956
3 Sheets—Sheet 1
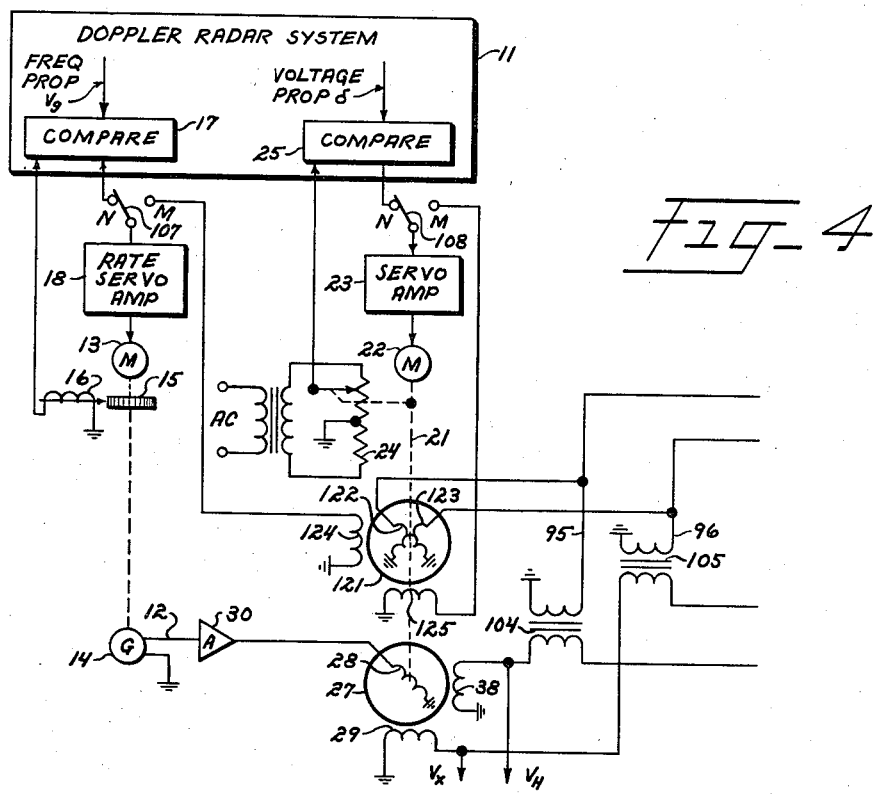
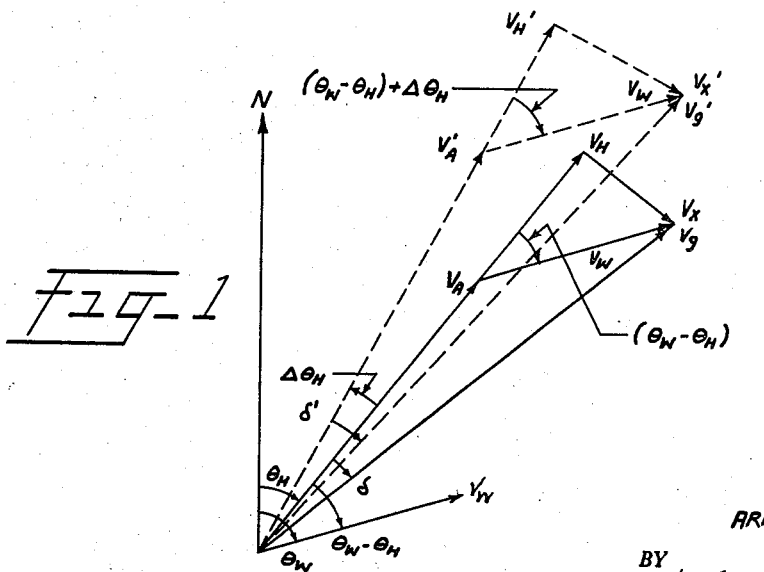
INVENTOR.
ARDEN H. FREDRICK
JOHN W. GRAY
BY
ATTORNEY

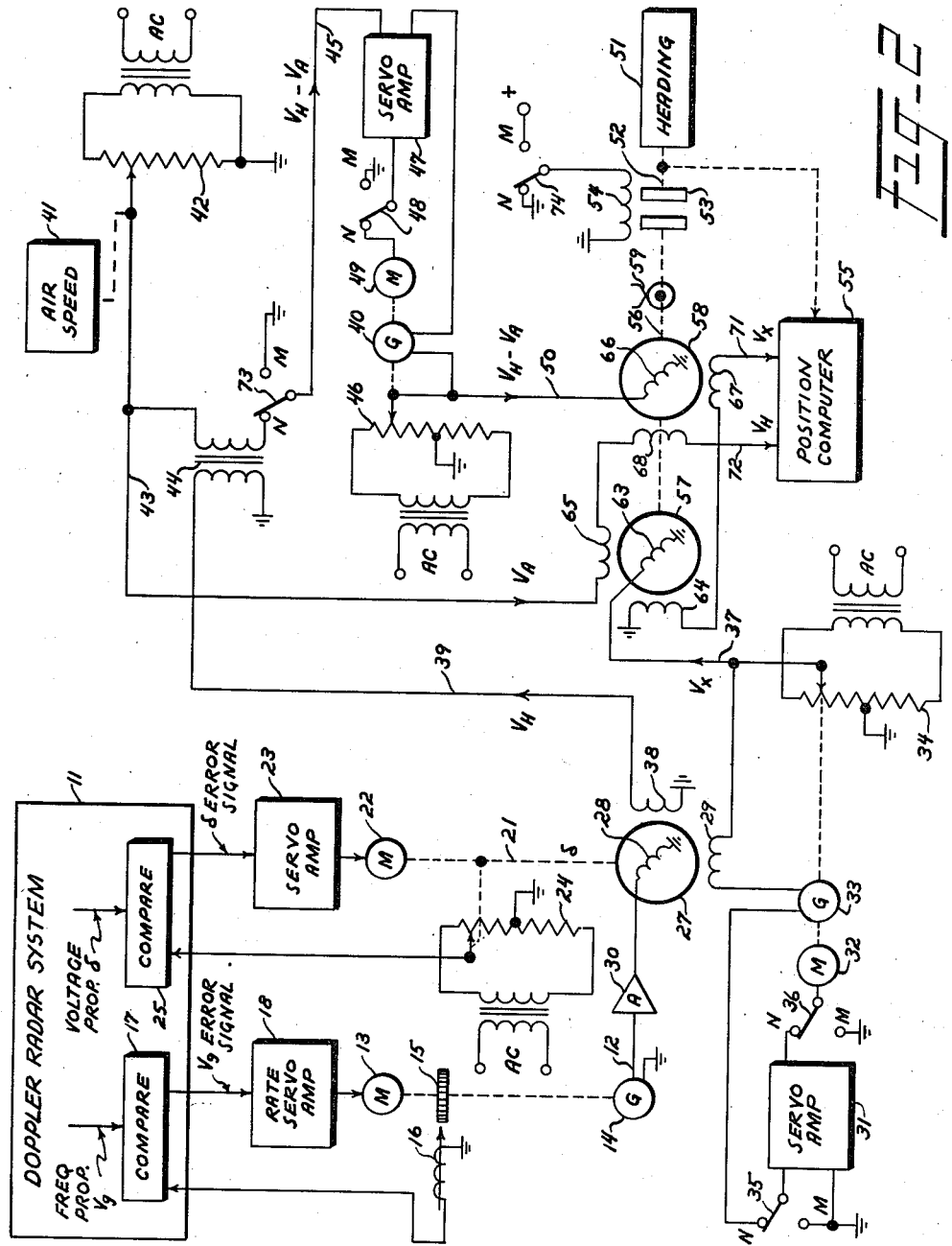

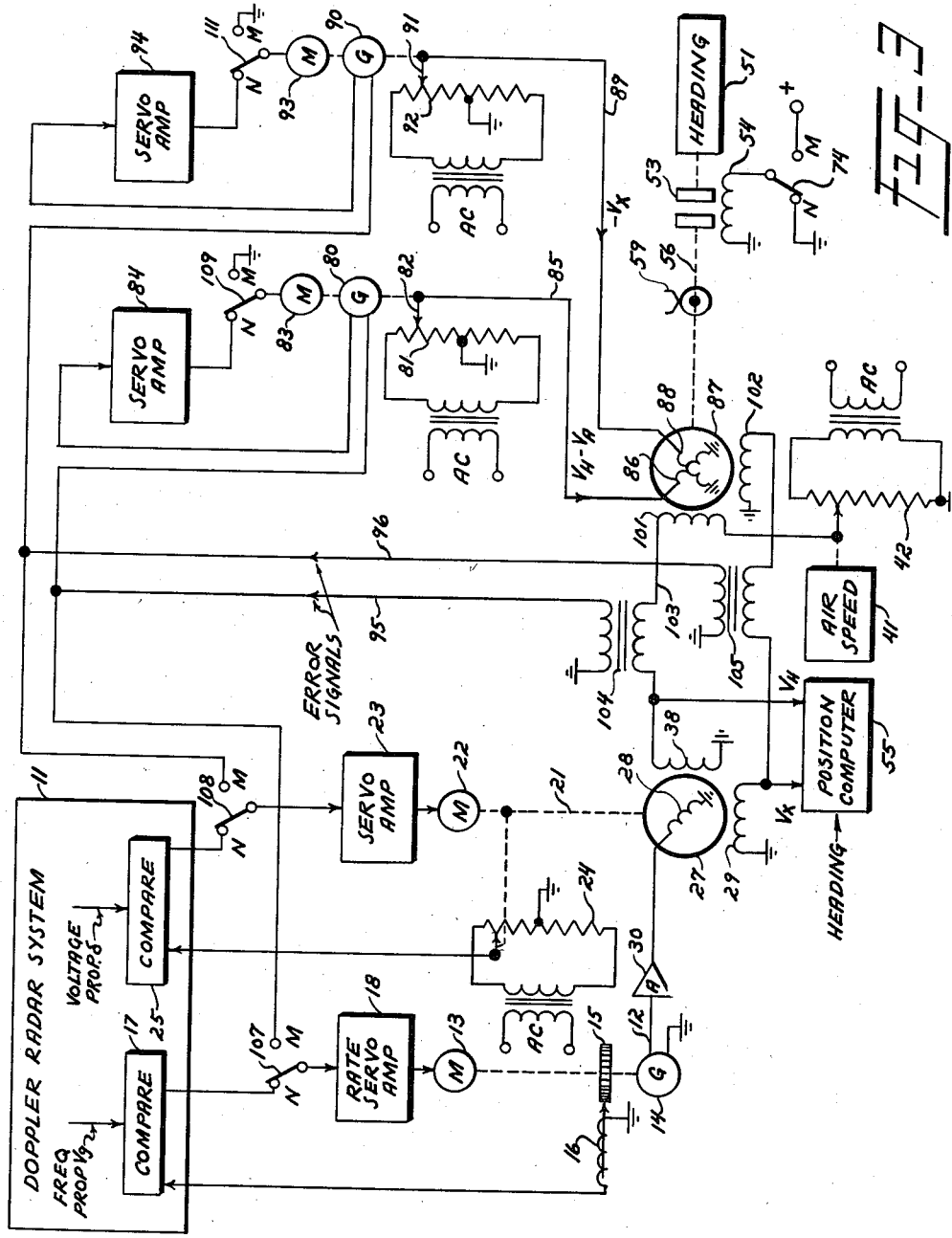

2,849,184
WIND COMPUTER

Arden H. Fredrick, Mount Kisco, and John W. Gray, Pleasantville, N. Y., assignors to General Precision Laboratory Incorporated, a corporation of New York Application August 16, 1956, Serial No. 604,498

5 Claims. (Cl. 235—61)

This invention relates in general to dead reckoning position computers and more particularly to apparatus for allowing continuous computation of position even if some of the input data normally supplied are temporarily absent.

A dead reckoning computer can be constructed which will compute and indicate continuously the present position of an aircraft in flight provided that the position of the craft at the start of the flight is known and provided that there is continuously available data indicative of heading angle, drift angle and ground speed. The heading angle may be determined by means of magnetic, astral, or gyroscopic compasses, or combinations thereof. Radio apparatus has recently been developed which continuously measures the drift angle and the ground speed of the aircraft by means contained within the aircraft itself, totally independent of ground stations.

Computers as above described have been developed to indicate present position with a high degree of accuracy as long as the radio apparatus continues to determine ground speed and drift angle accurately. However, the signals from the radio apparatus may be temporarily interrupted or unreliable. For example, atmospheric conditions or the nature of the terrain over which the craft is flying may cause the signal-to-noise ratio to drop to the point where reliable operation is impossible. In the case of military aircraft, the tactical situation may require periods of radio silence. Under such conditions, the position computer should not cease its operation entirely, but should continue to compute present position from the best information available. Position computer operation with only a portion of the normally available input data is often termed "memory" operation and some form of "memory" operation is usually provided for.

The determination of heading angle is not affected by the inoperativeness of the radio apparatus so that one form of memory operation may be secured by assuming that the drift angle and ground speed remain constant at the value obtaining when the radio apparatus ceases to function. This may be accomplished by supplying the position computer with the last determined, or "remembered," values of drift angle and ground speed, whereupon the computer will continue to operate and indicate present position. A change in speed of the aircraft obviously causes an incorrect value of ground speed to be fed to the computer, and will, in general, cause a change in drift angle since drift angle is one angle of the triangle comprising the vectors representing ground speed and direction, air speed and direction, and wind speed and direction. For the same reason, a change of course will affect both drift angle and ground speed. It is therefore apparent that the foregoing method of operation will yield satisfactory results only if the aircraft alters neither its course nor speed during memory operation.

A better form of memory operation can be secured by assuming that the wind speed and wind direction remain constant at the value obtaining when the radio apparauts ceases to function. Such operation can be obtained by the means of an apparatus such as that described in the copending application of Gray and Tull, Serial No. 537,011 filed September 27, 1955 for Wind Computer. That application describes apparatus in which a wind computer is provided which normally computes wind speed and wind direction continuously from data indicative of heading angle, air speed, ground speed and drift angle. Normally, no use is made of these computed values of wind speed and wind direction. During memory operation, the connections are altered so that ground speed and drift angle are computed from heading angle, air speed, wind speed, and wind direction. These computed values of ground speed and drift angle, instead of the normally measured values, are supplied to the position computer.

A wind computer as above described is satisfactory for use with a position computer which requires input data consisting of heading angle, ground speed and drift angle but requires modification for use with a position computer designed to operate with input data consisting of heating angle the along heading component of ground velocity and the cross heading component of ground velocity.

It is an object of this invention to provide apparatus which will allow the aircraft to maneuver during periods of inoperativeness of the radio apparatus without seriously affecting the accuracy of the indication of the position computer.

Another object of the invention is to provide apparatus for use with radio apparatus which measures ground speed and drift angle continuously for computing outputs indicative of the along heading and cross heading components of ground velocity both when the radio apparatus is operative and when it is inoperative.

In accordance with the invention, the along heading and cross heading components of ground velocity are normally computed from ground speed and drift angle and passed directly to the position computer. At the same time, two voltages are derived continuously, the first indicative of the difference between the along heading component and air speed and the second indicative of the cross heading component. Both of these voltages are in such a form that they may be stored or "remembered" in case of failure of the radio apparatus. In the memory mode of operation, the last computed values of these voltages are used along with data indicative of air speed and change of heading angle to compute the along heading and cross heading components of ground velocity.

For a clearer understanding of the invention, reference may be made to the following detailed description and the accompanying drawing in which:

Figure 1 is a diagram showing the geometry of the problem;

Figure 2 is a schematic diagram of one embodiment of the invention;

Figure 3 is a schematic diagram of another embodiment of the invention and

Figure 4 illustrates a modification of the apparatus shown in Fig. 3.

Referring now to Fig. 1, the solid lines indicate the various velocity vectors of an aircraft flying with an air speed $V_A$ at a heading angle $\theta_H$ in the presence of wind having a velocity $V_W$. The ground velocity $V_g$ of the aircraft is, of course, the resultant of the vectors representing air velocity and wind velocity and may be resolved into two components $V_H$ and $V_X$ representing respectively the along heading and cross heading components of ground velocity. It is apparent from the drawing that $$V_H = V_A + V_W \cos(\theta_W - \theta_H) \quad (1)$$
$$V_X = V_W \sin(\theta_W - \theta_H) \quad (2)$$

As will be explained subsequently, in the normal mode of operation $V_H$ and $V_X$ are computed from the measured values of ground speed, $V_g$, and drift angle $\delta$, and passed directly to the position computer. At the same time the apparatus derives voltages indicative of $V_X$ and $(V_H - V_A)$ in such a manner that the last computed values are available at any time that it becomes necessary to alter the mode of operation.

The dotted lines of Fig. 1 represent the various velocity vectors at any time after the mode of operation has been changed. The new values are represented by primes of the former symbols. From the drawing it can be seen that $$V'_H = V'_A + V_W \cos[(\theta_W - \theta_H) + (\Delta\theta_H)] \quad (3)$$

$$V'_X = V_W \sin[(\theta_W - \theta_H) + (\Delta\theta_H)] \quad (4)$$

Equations 3 and 4 with appropriate substitutions from Equations 1 and 2 reduce to $$V'_H = V'_A + (V_H - V_A)\cos(\Delta\theta_H) - V_X \sin(\Delta\theta_H) \quad (5)$$

$$V'_X = V_X \cos(\Delta\theta_H) + (V_H - V_A)\sin(\Delta\theta_H) \quad (6)$$

Equations 5 and 6 are expressions for computing $V'_H$ and $V'_X$ from $V'_A$, $(\Delta\theta_H)$, and the remembered values of $(V_H - V_A)$ and $V_X$.

Referring now to Fig. 2, there is shown a Navigation System 11 which is capable of measuring continuously the ground speed and drift angle of the aircraft. The details of this instrument are not a part of the present invention but at the present state of the art it is preferred that the instrument comprise a Doppler radar system including a transmitter, receiver, antenna, servomechanisms, a frequency tracker and other components necessary for deriving a voltage whose frequency is proportional to ground speed and another voltage whose magnitude is proportional to the drift angle. The Navigation System 11 may, for example, be similar to that described in the copending application of Tull and Gillette, Serial No. 749,184 filed May 20, 1947 for Navigation System or to that described in the copending application of Gray, Hales and Greenwood, Serial No. 410,882, filed February 17, 1954 for World Wide Navigation System.

A servomechanism is provided for deriving a voltage on conductor 12 proportional to ground speed. This servomechanism comprises motor 13 on the shaft of which is mounted a tachometer generator 14 which generates a voltage of constant frequency the magnitude of which is proportional to its speed of rotation. Also mounted on the motor shaft is a tone wheel 15 which comprises a disc of magnetic material having teeth around its periphery and which cooperates with a pickup coil 16 to produce an alternating current voltage the frequency of which is proportional to the speed of rotation of the shaft. If desired the tone wheel can be an optical tone wheel having a suitable light source and photo sensitive element instead of the magnetic arrangement shown. The output of the coil 16 is led to a comparing circuit 17 where its frequency is compared with that of the ground speed signal in order to develop an error signal indicative of the difference between the two frequencies. The error signal is led to a rate servo amplifier 18 which controls the motor 13. The servo amplifier 18 is of conventional design and it causes the motor 13 to increase in speed when the error signal is of one sense and to decrease in speed when the error signal is of opposite sense. The amplifier gain is such that a negligibly small error signal is required to produce a constant motor speed. The entire servomechanism just described therefore operates so as to place on conductor 12 a voltage the magnitude of which is proportional to the ground speed of the aircraft.

Another servomechanism is provided to position a shaft 21 in accordance with the drift angle of the aircraft. This servomechanism comprises a motor 22 controlled by a servo amplifier 23. The shaft 21 also positions the slider of a potentiometer 24 having a grounded center tap and the extremities of which are excited by a suitable source of alternating current. The potential of the slider of potentiometer 24 is compared with the voltage proportional to drift angle in a comparing circuit 25 and any difference in these voltages produces an error signal which operates the servo amplifier 23.

The apparatus illustrated in Fig. 2 has two modes of operation—"normal" and "memory." These modes are selected by the positions of the various switches shown which, for the moment, will be assumed to be in their normal position as shown in the drawing.

A resolver 27 has its rotor positioned by the shaft 21 and has its rotor winding 28 energized by the voltage proportional to ground speed from conductor 12 through a booster amplifier 30. The voltage induced in the stator winding 29 is therefore proportional to $V_g \sin \delta$ which is equal to $V_X$. A position servo comprising a servo amplifier 31, a motor 32 and a tachometer generator 33 positions the slider of a potentiometer 34 having a grounded center tap and which has its extremities connected to a suitable source of alternating current. An error signal comprising the series combination of the voltage of winding 29, the voltage between the slider and the center tap of the potentiometer 34 and the voltage of the tachometer generator 33 is led through a switch 35 to the input of the servo amplifier 31 the output of which passes through the switch 36 and drives the motor 32. The input data is subject to rapid fluctuations and since the apparatus may be switched to memory operation at any time it is desirable that the remembered quantities represent average rather than transient values. The tachometer generator 33 is therefore included in order to give the servo loop a long time constant on the order of thirty to sixty seconds. The voltage of conductor 37, connected to the slider of the potentiometer 34, is therefore proportional to the averaged value of $V_X$.

The voltage induced in the stator winding 38 of the resolver 27 is proportional to $V_g \cos \delta$ which is equal to $V_H$ and this voltage is applied to the conductor 39. The shaft of the usual air speed meter 41 positions the slider of a potentiometer 42 which is connected to a source of alternating current so that the potential of conductor 43 connected to the slider is proportional to air speed $V_A$. The voltage of conductor 39 is passed through an isolating transformer 44 and the voltage of the secondary, which is also proportional to $V_H$, has subtracted from it the voltage of conductor 43 so that the voltage on conductor 45 is proportional to $V_H - V_A$. This voltage is compared with the voltage between the slider and the grounded center tap of potentiometer 46 the extremities of which are connected to a suitable source of alternating current and the difference in these voltages is applied to a servo amplifier 47 the output of which passes through switch 48 and controls a motor 49 which in turn positions the slider of the potentiometer 46. A tachometer generator 40 is included in the servo loop also to give the loop a long time constant so that the conductor 50, which is connected to the slider of potentiometer 46, has impressed upon it a potential proportional to the averaged value of $V_H - V_A$.

A heading measuring instrument 51 is also provided and this instrument may comprise a magnetic, gyroscopic or astral instrument or a combination thereof. The shaft 52 of the instrument 51 is connected directly to a position computer 55 and is also connected to one plate of a normally disengaged clutch 53 which may be engaged by the energization of a solenoid 54. The other plate of the clutch 53 is connected to a shaft 56 which positions the rotors of two resolvers 57 and 58. A zero return spring 59 normally maintains the shaft 56 in its reference or zero position.

The rotor winding 63 of the resolver 57 is excited by the potential on conductor 37 which, it will be recalled, is proportional to $V_X$. The voltages on the stator windings 64 and 65 are therefore proportional respectively to $V_X \cos \Delta\theta_H$ and $V_X \sin \Delta\theta_H$ where $\Delta\theta_H$ represents the angular position of the shaft 56. The rotor winding 66 of the resolver 58 is energized by the voltage of conductor 50 which, it will be recalled, is proportional to $V_H - V_A$ so that the voltages induced in stator windings 67 and 68 are proportional respectively to $(V_H - V_A) \sin \Delta\theta_H$ and $(V_H - V_A) \cos \Delta\theta_H$.

In the normal mode of operation $\Delta\theta_H$ is equal to zero so that the voltage induced in the stator winding 64 is proportional to $V_X$. This voltage is added, the voltage on stator winding 67 but since $\Delta\theta_H$ is equal to zero the voltage induced in stator winding 67 is zero. Therefore, the voltage on conductor 71 is proportional to $V_X$ and is passed directly to the position computer 55. The voltage on conductor 43, which is proportional to $V_A$, has added thereto the voltages induced in stator windings 65 and 68. Since $\Delta\theta_H$ is equal to zero no voltage is induced in winding 65, but winding 68 has a voltage proportional to $V_H - V_A$ induced therein so that the resulting voltage on conductor 72 is proportional to $V_H$ and is passed to the position computer 55.

Operation in the memory mode may be required when the tactical situation requires radar silence or when the signal to noise ratio renders the operation of the radar instrument unreliable. Memory operation may be initiated manually or automatically, but in either event all the switches shown in Fig. 2 are thrown to the opposite position from that illustrated. Switches 35 and 36 are opened so that the motor 32 remains stationary and the voltage of conductor 37 is proportional to the last computed value of $V_X$. Similarly switches 48 and 73 are opened so that motor 49 remains stationary and the voltage of conductor 50 remains constant at the last computed value of $V_H - V_A$. The switch 74 connects a source of voltage to the solenoid 54 thereby engaging the clutch 53 so that the shaft 56 is positioned in accordance with any changes in heading angle occurring subsequently. The rotor winding 63 of the resolver 57 is energized by the voltage of conductor 37 which is the last remembered value of $V_X$ while the rotor winding 66 of resolver 58 is excited by the last computed value of $V_H - V_A$. The voltage of conductor 71 is now made up of the sum of voltages induced in windings 64 and 67 which are respectively $V_X \cos \Delta\theta_H$ and $(V_H - V_A) \sin \Delta\theta_H$, which, as shown by Equation 6, is equal to $V'_X$.

The voltage of conductor 72 is made up of the voltage on conductor 43 which is proportional to $V_A$ from which is subtracted the voltage induced in winding 65 which is proportional to $V_X \sin \Delta\theta_H$ and to which is added the voltage induced in winding 68 which is proportional to $(V_H - V_A) \cos \Delta\theta_H$. As shown by Equation 5, the resulting voltage is proportional to $V'_H$.

It is therefore seen that whether the apparatus is operating in its normal or in its memory mode, the voltages of conductors 71 and 72 are maintained proportional to $V_X$ and $V_H$ at all times.

Referring now to Fig. 3, there is shown another embodiment of the invention, many components of which are identical to those shown in Fig. 2 and which are denoted by like reference characters. In "normal" operation, voltages proportional to $V_X = V_g \sin \delta$ and $V_H = V_g \cos \delta$ are induced in stator windings 29 and 38 of resolver 27 in the same manner as previously described in connection with Fig. 2. Also, the shaft 56 is maintained in its reference, or zero, position by the spring 59 during "normal" operation, while in "memory" operation the heading angle measurer positions the shaft through clutch 53, as previously explained. Lastly, the air speed meter 41 adjusts the position of the slider of potentiometer 42 in the same manner as in the embodiment of Fig. 2. The remainder of the apparatus operates somewhat differently.

A potentiometer 81 having a grounded center tap has a source of alternating current impressed across its extremities and has its slider 82 positioned by means of a motor 83 which in turn is normally controlled by a servo amplifier 84. A tachometer generator 80 on the motor shaft has its output voltage connected in series with the input to the servo amplifier 84 in order to average the input data, as explained in connection with the generator 33 of Fig. 2. The slider 82 is connected to a conductor 85 so that the voltage of slider 82 energizes one rotor winding 86 of a resolver 87 mounted on the shaft 56. Another rotor winding 88 is similarly energized by a conductor 89 connected to the slider 91 of a potentiometer 92 having a grounded center tap and the extremities of which are connected across a suitable source of alternating current. The slider 91 is positioned by means of a motor 93 which in turn is normally controlled by a servo amplifier 94. An averaging tachometer generator 90 is included in this servo loop also.

During normal operation the servo amplifiers 84 and 94 are supplied with error signals which appear on conductors 95 and 96 respectively. To explain the nature of these error signals and how they operate, let it be assumed that the sliders 82 and 91 are at any arbitrary positions so that the potentials of conductors 85 and 89 may be denoted by A and B respectively, and let it also be assumed that the shaft 56 is at any arbitrary angle $\theta$. Then the voltage induced in stator winding 101 will be $$A \cos \theta + B \sin \theta$$

while the voltage induced in stator winding 102 will be $A \sin \theta - B \cos \theta$. The voltage on conductor 103 will be the voltage induced in winding 101 plus a voltage proportional to air speed from potentiometer 42, or $$A \cos \theta + B \sin \theta + V_A$$

This voltage is subtracted from that of winding 38 in the primary of a transformer 104 so that the error signal, $e_1$, on conductor 95 is $$e_1 = V_H - [A \cos \theta + B \sin \theta + V_A] \qquad (7)$$

The voltage of stator winding 102 is subtracted from the voltage of winding 29 in the primary of a transformer 105 so that the error signal on conductor 96 is $$e_2 = V_X - [A \sin \theta - B \cos \theta] \qquad (8)$$

During "normal" operation, $\theta$ is maintained equal to zero by the spring 59 and therefore it is obvious that $e_1$ can vanish only if $A = V_H - V_A$ and $e_2$ can vanish only if $B = -V_X$. Therefore the voltages on conductors 85 and 89 are proportional to $V_H - V_A$ and $-V_X$ respectively.

In "memory," switches 107 and 108 disconnect the servo amplifiers 18 and 23 from comparing circuits 17 and 25 and connect them to conductors 95 and 96. Switches 109 and 111 disconnect the motors 83 and 93 from servo amplifiers 84 and 94 so that the sliders 82 and 91 remain stationary and bear potentials proportional to the last computed values of $(V_H - V_A)$ and $(-V_X)$ respectively. The switch 74 energizes solenoid 54 thus engaging the clutch 53 so that shaft 56 is positioned in accordance with subsequent changes in heading angle, $\Delta\theta_H$.

In memory operation, the known quantities are the remembered values of $(V_H - V_A)$ and of $V_X$, and the measured values of change in heading angle, $\Delta\theta_H$, and air speed, $V_A$. The values of $V'_H$ and $V'_X$ are computed by means of two error signals. The error signal on conductor 95 adjusts the speed of motor 13 and the voltage of conductor 12 to be proportional to ground speed, $V_g$, while the error signal on conductor 96 adjusts the position of shaft 21 to be equal to the drift angle, $\delta$. It can be seen that if $V_g$ and $\delta$ are correct, the resolver 27 will transform these values to the desired values, $V'_H$ and $V'_X$ which are then passed to the position computer 55.

In order to understand how the error signals are formed and how they control motors 13 and 22 properly, let it be assumed that the voltage of conductor 12 has some arbitrary value C and that the shaft 21 is positioned at some arbitrary angle $\phi$. The voltage induced in winding 38 of resolver 27 will then be $C \cos \phi$. The voltage of conductor 103 will be $$(V_H - V_A) \cos \Delta\theta_H - V_X \sin \Delta\theta_H + V_A$$

This voltage is subtracted from the voltage of winding 38 so that the error signal on conductor 95 is $$e_3 = C \cos \phi - [(V_H - V_A) \cos \Delta\theta_H - V_X \sin \Delta\theta_H + V_A]$$

Similarly, the voltage induced in winding 29 of resolver 27 will be $C \sin \phi$ and has subtracted from it the voltage induced in winding 102 which is $$(V_H - V_A) \sin \Delta\theta_H + V_X \cos \Delta\theta_H$$

The resulting error signal on conductor 96 will be $$e_4 = C \sin \phi - [(V_H - V_A) \sin \Delta\theta_H + V_X \cos \Delta\theta_H]$$

From Equations (5) and (6) the expressions in brackets are seen to be equal to $V'_H$ and $V'_X$ respectively. From Fig. 1 it is seen that $V'_H = V'_g \cos \delta'$ and $V'_X = V'_g \sin \delta'$. Making these substitutions the error signals become $$e_3 = C \cos \phi - V'_g \cos \delta' \quad (9)$$
$$e_4 = C \sin \phi - V'_g \sin \delta' \quad (10)$$

The error signal $e_3$ adjusts C and $e_4$ adjusts $\phi$. It is apparent that both error signals will vanish when C is adjusted to equal $V'_g$ and $\phi$ is adjusted to equal $\delta'$, and the two servos cooperate to adjust shaft 21 to the new drift angle, $\delta'$ and the voltage of conductor 12 to the new ground speed, $V'_g$. Resolver 27 then computes $V'_H$ and $V'_X$ and these values are passed to the position computer 55.

The arrangement illustrated in Fig. 3 operates satisfactorily under the conditions usually encountered, where $\delta$ is reasonably small. If particular conditions make it necessary to derive more positively acting error signals, they may be obtained as shown in Fig. 4. The components in Fig. 4 are identical to those of Fig. 3 except for the addition of a resolver 121 mounted on the shaft 21. In memory operation, the error signals $e_3$ and $e_4$ on conductors 95 and 96 are led to the rotor windings 122 and 123 of resolver 121 and two new error signals $e_5$ and $e_6$ are obtained from the stator windings 124 and 125 and are led to the memory contacts of switches 107 and 108 so as to control motors 13 and 22.

The voltage induced in winding 124 will be $$e_5 = e_3 \cos \phi + e_4 \sin \phi$$

and the voltage induced in winding 125 will be $$e_6 = e_3 \sin \phi - e_4 \cos \phi$$

These equations reduce to $$e_5 = C - V'_g \cos (\phi - \delta') \quad (11)$$
$$e_6 = V'_g \sin (\delta' - \phi) \quad (12)$$

$e_6$ adjusts $\phi$ and can be zero only when $\phi = \delta'$. When $\phi = \delta'$, $e_5$ can be zero only if $C = V'_g$. Thus it is seen that the use of resolver 121 provides positively acting error signals, should this be necessary.

What is claimed is:

1. A navigation system comprising, a dead reckoning position computer, means for measuring heading angle and supplying data indicative thereof to said computer, normally operative means for measuring ground speed and drift angle, means for normally deriving first and second voltages respectively indicative of the along heading and cross heading components of ground velocity from the measured values of ground speed and drift angle, means for normally supplying said first and second voltages to said position computer, means for measuring air speed, means operative while said normally operative means is operative for deriving a third voltage indicative of the difference between the along heading component of ground speed and air speed, means for storing said third voltage, means for storing a fourth voltage indicative of the cross heading component of ground velocity, and means operative when said normally operative means is inoperative for computing the along heading and cross heading components of ground velocity from said stored third voltage, said stored fourth voltage, air speed and change of heading angle and for supplying the computed components to said position computer.

2. In a navigation system which includes means for measuring air speed, means for measuring heading, normally operative means for measuring ground speed and drift angle and a position computer, apparatus for deriving voltages indicative of the along heading and cross heading components of ground velocity in either a normal or an alternative mode of operation and for supplying these voltages to the position computer, comprising, means operative in the normal mode for deriving voltages indicative of the along heading and cross heading components of ground velocity from the measured values of ground speed and drift angle and for supplying these voltages to the position computer, means operative in the normal mode for adjusting first and second voltage sources to values indicative respectively of said cross heading component and of the difference between said along heading component and air speed, switching means for causing the apparatus to operate in the alternative mode, means responsive to the actuation of said switching means for maintaining constant the adjustment of said first and second voltage sources, and means operative in the alternative mode for deriving voltages indicative of the along heading and cross heading components of ground velocity from the voltage of said sources the measured value of air speed and the change in heading angle subsequent to actuation of said switching means.

3. An analog computer for an airborne navigation system having normal and alternative modes of operation comprising means operative in the normal mode for continuously deriving first and second voltages indicative respectively of the along heading and cross heading components of ground velocity from data indicative of ground speed and drift angle, means operative in the normal mode for continuously deriving a third voltage indicative of the difference between said along heading component and the measured value of air speed, switch means for altering the electrial configuration so as to operate in the alternative mode, means responsive to actuation of said switch means for storing the last derived values of said second and third voltages, means responsive to actuation of said switch means for measuring subsequent changes in heading angle, and means operative in the alternative mode for deriving voltages indicative of the along heading and cross heading components of ground velocity from the stored values and from the measured values of air speed and change in heading angle.

4. In a navigation system which includes means for measuring air speed, means for measuring heading angle, normally operative means for measuring ground speed and drift angle and a position computer, apparatus for deriving voltages indicative of the along heading and cross heading components of ground velocity in either a normal or an alternative mode of operation and for supplying these voltages to the position computer, comprising, means operative in the normal mode for deriving voltages indicative of the along heading and cross heading components of ground velocity from the measured values of ground speed and drift angle, means operative in the normal mode for adjusting first and second voltage sources to values indicative respectively of said cross heading component and of the difference between said along heading component and air speed, first and second resolvers mounted on a common shaft, means operative in the normal mode for maintaining said shaft in a reference position, means for energizing the rotor winding of said first resolver from said first voltage source, means for energizing the rotor winding of said second resolver from said second voltage source, means for combining the voltages induced in one stator winding of each of said resolvers to obtain a voltage proportional to said cross heading component, means for combining the voltages induced in the other stator winding of each resolver with a voltage proportional to air speed to obtain a voltage proportional to said along heading component, switch means for changing the electrical configuration of the apparatus so as to operate in its alternative mode, means responsive to actuation of said switch means for maintaining constant the adjustment of said first and second voltage sources and means responsive to actuation of said switch means for adjusting said shaft in accordance with subsequent changes in heading angle.

5. In a navigation system which includes means for measuring air speed, means for measuring heading angle, normally operative means for measuring ground speed and drift angle and a position computer, apparatus for deriving voltages indicative of the along heading and cross heading components of ground velocity in either a normal or an alternative mode of operation and for supplying these voltages to the position computer, comprising, a first servo mechanism operative in the normal mode for placing a potential on a conductor, a second servomechanism operative in the normal mode for adjusting the position of a first shaft, a first resolver operative in both the normal and alternative modes for deriving first and second voltages proportional to the product of the voltage on said conductor and the sine and cosine respectively of the angular position of said first shaft, means for supplying said first and second voltages to said position computer, a second resolver mounted on a second shaft, means operative in the normal mode for maintaining said shaft in a reference position, means for energizing one rotor winding of said second resolver from a first source of voltage normally adjusted by a third servomechanism, means for energizing the other rotor winding of said second resolver from a second source of voltage normally adjusted by a fourth servomechanism, means for adding a voltage proportional to air speed to the voltage induced in one stator winding of said second resolver and for subtracting the sum from said second voltage to produce a first error signal, means for subtracting the voltage induced in the other stator winding of said second resolver from said first voltage to produce a second error signal, means for connecting said first and second error signals to said third and fourth servomechanisms respectively, switch means for rendering said third and fourth servomechanisms inoperative in the alternative mode, switch means for connecting said first and second servomechanisms to be controlled by error signals indicative of ground speed and drift angle in the normal mode and by said first and second error signals in the alternative mode, and means operative in the alternative mode for positioning said second shaft in accordance with changes in heading angle.

No references cited.